(12) United States Patent
Chung et al.

(10) Patent No.: US 9,608,443 B2
(45) Date of Patent: Mar. 28, 2017

(54) ENERGY STORAGE SYSTEM OF UNINTERRUPTIBLE POWER SUPPLY EQUIPPED WITH BATTERY AND METHOD OF DRIVING THE SAME

(71) Applicant: EHWA TECHNOLOGIES INFORMATION CO., LTD., Seoul (KR)

(72) Inventors: Sung Won Chung, Seoul (KR); Kyung Suk Lee, Seoul (KR); Dong Hun Yum, Gyeonggi-do (KR)

(73) Assignee: EHWA TECHNOLOGIES INFORMATION CO., LTD., Seoul (KR)

( * ) Notice: Subject to any disclaimer, the term of this patent is extended or adjusted under 35 U.S.C. 154(b) by 350 days.

(21) Appl. No.: 14/292,304

(22) Filed: May 30, 2014

(65) Prior Publication Data
US 2015/0035359 A1    Feb. 5, 2015

(30) Foreign Application Priority Data

Jul. 30, 2013    (KR) .......................... 10-2013-0090288

(51) Int. Cl.
*H02J 3/00* (2006.01)
*H02J 3/32* (2006.01)
*H02J 9/06* (2006.01)

(52) U.S. Cl.
CPC .................. *H02J 3/00* (2013.01); *H02J 3/32* (2013.01); *H02J 9/062* (2013.01); *Y10T 307/344* (2015.04)

(58) Field of Classification Search
None
See application file for complete search history.

(56) References Cited

U.S. PATENT DOCUMENTS

2007/0005192 A1 *  1/2007  Schoettle ............... H02J 9/062
                                                       700/286

FOREIGN PATENT DOCUMENTS

| GB | WO 2010089607 A1 * | 8/2010 | ............... H02J 3/32 |
| IE | WO 2013095478 A1 * | 6/2013 | ............. G06Q 50/06 |
| KR | 1020080054259 | 4/2009 | |
| KR | 1020110074941 | 6/2013 | |

* cited by examiner

*Primary Examiner* — Rexford Barnie
*Assistant Examiner* — Swarna N Chowdhuri
(74) *Attorney, Agent, or Firm* — David R. Stevens; Stevens Law Group

(57) ABSTRACT

Disclosed herein are the energy storage system of an Uninterruptible Power Supply (UPS) equipped with the battery and a method of driving the same. The energy storage system includes a commercial power source unit configured to supply a first power source to a load, and the battery configured to supply a second power source to the load. And the system monitors a power failure state in the commercial power source unit, determines a charging state of the battery, and controls the commercial power source unit and the battery in response to output of monitoring or determination, so that the first power source or the second power source is supplied to the load. A power reservation ratio for the use of power can be increased by reducing power used during daytime.

10 Claims, 8 Drawing Sheets

ENERGY STORAGE SYSTEM OF UNINTERRUPTIBLE POWER SUPPLY EQUIPPED WITH BATTERY AND METHOD OF DRIVING THE SAME

CROSS REFERENCE TO RELATED APPLICATION

The present application claims the benefit of Korean Patent Application No. 10-2013-0090288 filed in the Korean Intellectual Property Office on Jul. 30, 2013, the entire contents of which are incorporated herein by reference.

BACKGROUND OF THE INVENTION

1. Technical Field

The present invention relates to the energy storage system of an Uninterruptible Power Supply (UPS) equipped with the battery and a method of driving the same and, more particularly, to the energy storage system of a UPS equipped with the battery, wherein some capacity of the battery is used as an energy source by controlling the discharge power of the battery using a rectifier and a bidirectional converter used in the UPS, thereby being capable of reducing the consumption power of a user and using the remaining capacity as reserved power in emergency, and a method of driving the same.

2. Description of the Related Art

Recently, an energy storage system (ESS) that may be said to be the core of a smart grid is a system for storing energy. Various devices for storing energy have been developed. A representative storage device is for storing energy in the battery through a charger during night time for which a power demand is small and for discharging the stored energy through a discharger during time for which a power demand is great. This is commonly called a system association type energy storage system.

In order to store energy, a converter for converging AC into DC and an inverter for converting DC into Ac are basically required. In this case, if a product using DC as an energy source, such as the battery and a super capacitor, is used, an AC/DC conversion converter or a bidirectional converter having a charging/discharging function is also required. An UPS may basically perform AC/DC conversion and DC/AC conversion under the control of a controller and the charging/discharging function using a converter. Furthermore, an additional system for additional system association is required.

The UPS also has a function that is prepared for a case where an uninterruptible device is unable to perform a normal function owing to the failure of elements that form the UPS, such as the power converter and the battery, that is, an energy storage device.

In order to increase the use of an energy storage system based on a physical energy change or chemical energy conversion, lost of efforts have been made in a politic way. More particularly, lots of efforts are being made to development energy storage system technology for the supply of power consecutively, that is, continuously.

The battery has a factor in the reduction of the lifespan according to the number of times of charging and discharging depending on the type of battery. A lead battery is problematic in terms of inspection and management, such as ineffective handling in emergency, because the activation of a chemical substance that forms the battery, the terminal voltage irregularity of the battery, and a change in the generation of corrosion of the terminal unit are not checked. For this reason, a lithium battery further has a function called the battery management system (BMS) in order to prevent the problems and damage attributable to overcharging.

In particular, recently, a reduction of power attributable to the shortage of supply in the peak load of a commercial power source is emphasized. From a viewpoint of power demand management and owing to a difference in a billing system according to each time zone, there is a social and economical need, such as the operation of an emergency generator in order for consumers to manage demands, such as power bill management.

In such a reality, in general, the battery of a UPS owned by a power consumer has a capacity capable of stably supplying power required by the consumer for a specific time that is determined by the consumer, but this is only used when a power failure occurs in a commercial power source. That is, the existing UPS using the battery performs a discharging operation using power of the battery only in the state in which a power failure has occurred in an input power source. Although a momentary power failure occurs, a UPS is inevitably used in a computer server and production equipment that require a lot of time taken for recovery in order to prepare for the momentary power failure.

Examples of technology for solving the problem are disclosed in Patent Documents 1 and 2.

For example, Patent Document 1 discloses a method of estimating the remaining capacity of the battery, including steps of checking whether or not the battery is in the first connection state, checking whether the battery is in a discharging state or a charging state if, as a result of the check, the battery is found to be in the connection state, measuring voltage of the battery if, as a result of the check, the battery is found to be in discharging state, determining whether or not the battery has been stabilized by comparing the voltage of the battery with a predetermined stabilization determination voltage, calculating a voltage drop by calculating the amount of discharged current, calculating an open circuit voltage using the calculated voltage drop voltage and the measured voltage, calculating an initial remaining capacity corresponding to the calculated open circuit voltage, calculating the final remaining capacity using the initial remaining capacity and a predetermined diequilibration efficiency.

Furthermore, Patent Document 2 discloses an apparatus for diagnosing an aging state and a diagnostic method using the same, wherein an ESR value or a loss angle value tan $\delta$ are measured by flowing a measurement current signal into the electrolytic capacitor of the DC booth of a power conversion device, the malfunction or damage of the power conversion device is diagnosed based on the measured ESR value or loss angle value, characteristic data, such as internal resistance of each battery to be measured, is measured so that the aging state of the battery system that is an essential element of a UPS can be measured and monitored at the same time, and a complex abnormal state according to the aging or deterioration of the power conversion device is previously monitored diagnosed based on the measured characteristic data.

However, the aforementioned prior arts do not disclose technology in which the battery is used as energy more efficiently in a UPS basically including a rectifier (or a converter), a charging/discharging unit (or a bidirectional converter), an inverter, a bypass, a control board, and the battery.

PRIOR ART DOCUMENT

Patent Document (Patent Document 1) Korean Patent No. 10-1261149 (issued on Apr. 29, 2013)
(Patent Document 2) Korean Patent No. 10-0998577 (issued on Nov. 30, 2010)

SUMMARY OF THE INVENTION

Accordingly, the present invention has been made keeping in mind the above problems occurring in the prior art, and an object of the present invention is to provide the energy storage system of a UPS equipped with the battery and a method of driving the same, which are capable of reducing power consumption by reusing energy using the battery, that is, an energy source, more economically, providing a user with profit resulting from the power consumption, and improving productivity to a maximum extent while providing power to the user.

Another object of the present invention is to provide the energy storage system of a UPS equipped with the battery and a method of driving the same, which are capable of increasing the discharging efficiency of the battery by controlling discharging power so that a specific amount of the battery capacity is not rapidly discharged.

Further another object of the present invention is to provide the energy storage system of a UPS equipped with the battery and a method of driving the same, which are capable of effectively handling demand management and power bill management even when a commercial power source is normally supplied.

Yet another object of the present invention is to provide the energy storage system of a UPS equipped with the battery and a method of driving the same, which are capable of supplying stabilized power to a load although an energy storage operation is performed in accordance with a problem, such as a DC link overvoltage alarm attributable to a rise of DC link voltage due to the influence of a bidirectional converter.

In accordance with an aspect of the present invention, an energy storage system included in an UPS includes a commercial power source unit configured to supply a first power source to a load, the battery configured to supply a second power source to the load, a power failure monitoring unit configured to monitor a power failure state in the commercial power source unit, a charging/discharging determination unit configured to determine a charging state of the battery, and a power source control unit configured to control the commercial power source unit and the battery in response to output of the power failure monitoring unit or the charging/discharging determination unit so that the first power source or the second power source is supplied to the load.

The energy storage system in accordance with an embodiment of the present invention further includes an operation time setting unit configured to set an operation time of the load, wherein the power source control unit performs control based on the operation time set by the operation time setting unit so that the first power source and the second power source are supplied to the load.

In the energy storage system in accordance with an embodiment of the present invention, the power source control unit performs control in response to the charging state of the battery determined by the charging/discharging determination unit so that the first power source is supplied to the battery and performs control in response to the power failure state monitored by the power failure monitoring unit so that the first power source and the second power source are supplied to the load.

In the energy storage system in accordance with an embodiment of the present invention, the UPS includes a first UPS and a second UPS, the first UPS and the second UPS operate alternately, and the battery of the second UPS is charged when the battery of the first UPS is discharged.

In the energy storage system in accordance with an embodiment of the present invention, the UPS includes a first UPS and a second UPS, and the first UPS and the second UPS are driven simultaneously and charged simultaneously.

The energy storage system in accordance with an embodiment of the present invention further includes a display unit configured to display a state of the battery and an alarm unit configured to output a warning sound or an emergency lamp in response to a state displayed on the display unit.

In accordance with an aspect of the present invention, a method of operating a UPS including an energy storage system includes steps of (a) determining, by a power failure monitoring unit and a charging/discharging determination unit, a state of a commercial power source unit and a charging state of the battery for supplying a first power source and a second power source to a load, (b) setting, by an operation time setting unit, a peak time zone of the load, and (c) dividing, by a power source control unit, the first power source and the second power source in the peak time zone set at the step (b) and supplying the first power source and the second power source to the load.

In the method of driving the UPS in accordance with an embodiment of the present invention, the step (c) includes calculating, by the charging/discharging determination unit, a remaining capacity of the battery and performing, by the power source control unit, control so that the supply of the second power source is executed outside an essential remaining capacity of the battery that needs to be essentially maintained in emergency.

In the method of driving the UPS in accordance with an embodiment of the present invention, the step (c) includes supplying, by the power source control unit, the second power source periodically according to a capacity of the battery determined by the charging/discharging determination unit.

In the method of driving the UPS in accordance with an embodiment of the present invention, the step (a) includes displaying or notifying the state of the commercial power source unit and the operating state of the battery determined by the power failure monitoring unit and the charging/discharging determination unit.

In the method of driving the UPS in accordance with an embodiment of the present invention, the steps (a) to (c) are repeatedly executed by a first UPS and a second UPS.

In the method of driving the UPS in accordance with an embodiment of the present invention, the steps (a) to (c) are simultaneously performed by a first UPS and a second UPS.

DETAILED DESCRIPTION

Figure 1:
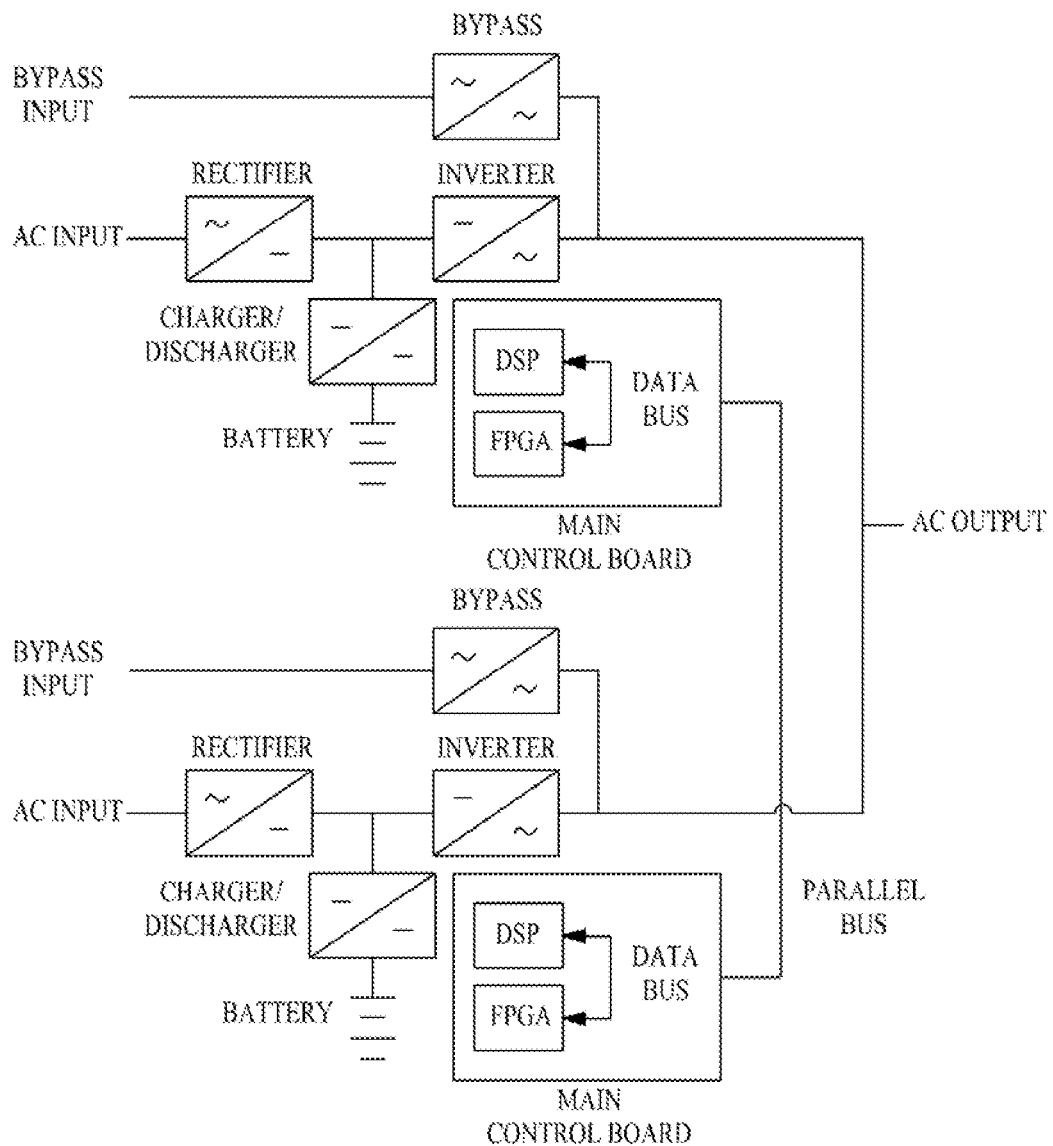
FIG. 1 is an exemplary diagram of the energy storage system of uninterruptible power supplies equipped with batteries in accordance with an embodiment of the present invention.

The above objects, other objects, and new characteristics of the present invention will become more apparent by technology disclosed in the specification and the accompanying drawings.

First, a relationship between a UPS to which the present invention is applied and the battery included in the UPS is described below.

The battery capacity of the UPS is determined according to the setting of a maximum discharging time.

The discharging current of a UPS for single phase and 3-phase output is identically calculated and determined by a UPS capacity and the battery use voltage. A discharging current Id is calculated as in Equation 1 based on a UPS of 100 KVA.

$$Id = \frac{100 \; KVA \times 0.8 \; \text{(load factor)}}{1.75 \; \text{(final voltage)} \times 240 \; \text{(number of cells)} \times 0.96 \; \text{(inverter efficiency)}} = 198 \; A \quad (1)$$

In Equation 1, assuming that the power failure compensation time of the UPS is 30 minutes and a lead battery is used according to Equation 1, a use capacity is a 2 V 250 AH 240 cells according to the specification of the battery manufacturer at a final voltage of 1.75 V. In this case, assuming that the power failure compensation time is 1 hour, the use capacity is a 2 V 400 AH 240 cells according to the specification of the battery manufacturer.

For example, if 30% of a total battery capacity is used in an energy storage operation and the remaining 70% thereof is used as emergency power for a power failure, Equation 2 is obtained.

$$AH = \frac{250 \; AH \times 30\%}{100} = 75 \; AH \quad (2)$$

In Equation 2, if the energy storage operation is set to 2 hours, Equation 3 is obtained.

$$I = \frac{75 \; AH}{2 \; H} = 37.5 \; A/H$$
$$I = 37.5 \; A \times 0.74 = 27.8 \; A/H \quad (3)$$

In Equation 3, 0.74 is battery 2-hour discharging efficiency 74%. If the battery is discharged for 3 hours, discharging efficiency is increased to 84%. That is, as the discharging time is increased, discharging efficiency becomes better. The discharging efficiency may be slightly different depending on the raw materials and manufacturer of the battery.

For the energy storage operation of the battery for 2 hours, a required current is 27.7 A per hour according to Equation 3.

The capacity of the UPS and the voltage condition of the battery may be different depending on a user, but most of users use loads less than 50% of an equipment capacity.

If a user uses a load of 50 KW, $$Id = \frac{50 \; KW}{1.75 \times 240 \times 0.96} = 124 \; A \quad (4)$$

As described above, DC power of 124 A is required. Power required for the rectifier is calculated as in Equation 5 based on 124 A.

$$124 \; A - 27.7 \; A = 96.3 \; A \quad (5)$$

Power for the energy storage operation is calculated as in Equation 6 according to the above equations.

$$27.8 \; A \times 1.75 \times 240 = 11.68 \; KW/H \quad (6)$$

If a user who has used the battery having the 30-minute power failure compensation time in the UPS capacity of 100 KVA uses a load of 50 KW/H, power reduced by the energy storage operation can be obtained as in Equation 6.

That is, the user can increase the utilization of the battery and secure emergency power for a power failure through the energy storage operation, recover some of an installation cost to the use of the battery through such a reduction of energy, and increase a power reservation ratio of power used through reduced power use during daytime.

Furthermore, if the battery capacity is increased in order to increase a power failure compensation time, power can be reduced more. The lifespan of the battery can be extended by reducing the number of times of discharging related to the lifespan.

As described above, the technology of the battery continues to be developed and the utilization of raw materials continues to be increased.

However, the lifespan of a lead battery for floating charging that is used in a UPS is expected to be 3 to 5 years. This may vary depending on recommended battery use temperature conditions (e.g., 20~25° C.). That is, if the lead battery for floating charging is used for 3 years using only a power failure compensation function, a cell failure in which the function of the battery is lost starts to occur and thus the battery becomes the subject of disuse.

The technology of the battery is developed, and the technology of a UPS is also developed. If technology in accordance with an embodiment of the present invention is grafted, it is expected that energy may be used more efficiently.

First, an important function of the UPS is to continue to supply a power source to a load when an input power source is subject to a power failure. If a power failure occurs in the input power source during the battery discharging operation, a discharging operation continues to be performed. If a power failure occurs in an input power source during the battery charging operation, a power source continues to be supplied to a load through a normal discharging operation. If the input power source is recovered, an energy storage operation is performed the battery is charged by determining the remaining battery capacity.

If the UPS performs a normal operation by the inverter during the energy storage operation, a power source continues to be supplied to the load in any case. If the inverter fails, the power source is supplied to the load through the bypass.

Second, in the parallel operation of uninterruptible power supplies, an energy storage operation is performed like in a single operation, but an additional advantage is that the uninterruptible power supplies alternately perform their discharging operations. That is, when one of the uninterruptible power supplies starts a discharging operation, the other of the uninterruptible power supplies performs a normal operation. When one of the uninterruptible power supplies finishes the discharging operation, it starts a charging operation and the other of the uninterruptible power supplies starts a discharging operation.

A user who uses a major load uses a lot of uninterruptible power supplies in parallel. In such a case, if the uninterruptible power supplies perform discharging operations one by one, an energy storage operation can be performed for a longer time. Accordingly, the time taken to charge the battery after the battery is discharged during daytime can be greater than the time when a single UPS is used, discharging efficiency of the battery can be increased, and the lifespan of the battery can be extended.

Furthermore, if the UPS repeatedly performs the energy storage operation during daytime, the battery is inevitably charged during daytime. A charging method for minimizing consumption power during the charging time needs to be taken into consideration. Furthermore, the design needs to be reviewed and performed according to a method recommended by the battery manufacturer, and the reuse of the raw materials of the battery having expired lifespan also needs to be taken into consideration.

In a UPS using the battery in accordance with an embodiment of the present invention, a main control board controls a rectifier and a charger/discharger for an energy storage operation.

In order to control the charger/discharger, the main control board sets an energy storage operation and operation start time.

For the energy storage operation, the UPS using the battery executes the setting of the battery capacity based on a power failure compensation time in response to a request from a user.

Furthermore, the battery applied to the present invention includes deep cycle service.

When the battery capacity is set, a discharging capacity is set by taking the depth of discharge (% DOD) of the battery into consideration. As the discharging capacity is increased, the charging/discharging cycle of the battery is reduced and thus the lifespan of the battery is reduced. For this reason, for example, the design may be performed so that only 30% of a total battery capacity is used in a discharging operation and the remaining 70% thereof is used as emergency power for the lifespan of the battery and a power failure.

The battery capacity according to a power failure compensation time is determined by the capacity of a UPS, efficiency of an inverter, the final voltage of the battery, and the number of batteries. In this case, the battery capacity is selected as a calculated current based on battery data.

The battery capacity of a UPS is selected based on a load of 100%, but a recommended load amount is 50%. Most of users use 50% or less of the capacity of a UPS. That is, a power failure compensation time may be more increased than that requested by a user depending on the use of a load.

For the energy storage operation, the main control board sets an energy storage operation time, the start time and the end time, the battery capacity, the final voltage of the battery, the number of batteries, the battery type, and the battery discharging capacity. The energy storage operation time is divided into the morning and the afternoon, that is, power peak time zones.

When the UPS is in a normal operating state, that is, when the UPS supplies a load to the inverter, the main control board calculates the battery discharging current for the energy storage operation based on a corresponding value.

In this case, when the energy storage operation time is checked, the main control board changes the charger into the discharger and increases the amount of discharging based on a current limit controlled by the bidirectional converter. The discharger performs discharging up to the battery discharging capacity limit, and the remaining power is supplied to the load through the rectifier.

Furthermore, like in the discharging characteristic of the battery, when the battery is discharged, the UPS performs an energy storage operation. When the discharging characteristic of the battery deviates, the UPS informs a user of an alarm state by outputting the battery abnormality alarm through a display window and the output. A loss attributable to a power failure can be minimized by such the battery check. The start and end of the discharging operation are also delivered to a user using a message so that the user can check the state of the UPS.

The battery has better discharging efficiency as the discharging time is increased. The main control board is configured by taking such better discharging efficiency into consideration.

When an end time set in the main control board is reached, the current limit of the bidirectional converter is released and thus the discharger switches to charger mode and charges the battery. Furthermore, when a discharging time set in the main control board is reached, the above operation is repeated. The above operation is repeatedly performed during daytime for which power consumption is great and charging is performed during time for which power consumption is small, thereby minimizing power consumption.

Furthermore, discharging voltage of the battery needs to be set by taking the depth of discharge (% DOD) of the battery into consideration. The lifespan of the battery is determined by the depth of discharge. In order to maximize the lifespan of the battery and the utilization of the battery by a user, the battery manufacturer sets the discharging voltage of the battery by taking the depth of discharge into consideration into consideration.

Furthermore, in order to prepare for a possible power failure for a long time or a possible power failure attributable to the failure of power system equipment on the user side, the design is performed so that the battery is discharged up to a specific voltage and the remaining voltage is prepared for the power failures.

The battery that may be used in the present invention may be made of lead (Pb), nickel (Ni), and lithium (Li) as raw and major materials and has the depth of discharge (% DOD).

The construction of the present invention is described below with reference to the accompanying drawings.

FIG. 1 is an exemplary diagram of the energy storage system of uninterruptible power supplies equipped with batteries in accordance with an embodiment of the present invention.

As shown in FIG. 1, the UPS equipped with the battery in accordance with an embodiment of the present invention includes a first UPS and a second UPS. The first UPS and the second UPS alternately operate. A construction in which when the battery of the first UPS is discharged, the battery of the second UPS is charged may be adopted. Furthermore, a construction in which the first UPS and the second UPS are discharged at the same time may be adopted.

Furthermore, elements shown in FIG. 1 correspond to a UPS that is commonly used in the field of the present invention and include a rectifier configured to receive and rectify a commercial power source AC INPUT, an inverter configured to convert the rectified DC into AC, a bidirectional DC-DC converter configured to charge a power storage device (hereinafter referred to as a 'battery') in order to charge the battery capable of charging/discharging the DC power rectified by the rectifier or supply the inverter with power charged into the battery, and a main control board.

The main control board includes a digital signal processor (DSP) and a field-programmable gate array (FPGA). The main control board controls the rectifier, the inverter, and the bidirectional DC-DC converter depending on the power supply state and conditions set by a user and also controls the general operation of the UPS, such as displaying operation conditions, an operating state, and a power supply state or receiving input from a user.

In the present invention, as shown in FIG. 1, the first UPS and the second UPS are provided, and a bypass line is further configured to supply a commercial power source to a load if the UPS does not operate due to a failure in the rectifier, the inverter, etc. The construction and operating principle of the bypass line are known in the art, and thus a detailed description thereof is omitted.

Furthermore, the elements of each of the first UPS and the second UPS shown in FIG. 1 include a rectifier, an inverter, and a bidirectional DC-DC converter for supplying power to the battery, supplementing insufficient voltage supplied by a commercial power source or electric generator, and supplying power when a power failure occurs, as disclosed in technology commonly used or known in the technical field of the present invention, for example, in Korean Patent No. 10-1211114 or 10-1247282. Accordingly, a detailed description of the known art is omitted.

For example, the power conversion semiconductor element of each of the rectifier, the inverter, the charger/discharger, and the bypass may be formed of any one of an Insulated Gate Bipolar Transistor (IGBT), a Silicon Controlled Rectifier (SCR), a Gate Turn-Off (GTO) transistor, and a Bipolar Junction Transistor (BJT). In particular, the rectifier may be configured to have a charger/discharger function, and the rectifier and the charger/discharger may be separately configured and driven. The rectifier or the charger/discharger may be formed of a switching element having a discharging current capacity suitable for the capacity of the UPS using one of an Insulated Gate Bipolar Transistor (IGBT), a Gate Turn-Off (GTO) transistor, and a Bipolar Junction Transistor (BJT) that enable high-speed switching so that the rectifier or the charger/discharger functions as an accurate and fast switch.

The main control board of FIG. 1 and various types of operation mode of the main control board are described below with reference to FIGS. 2 and 3.

Figure 2:
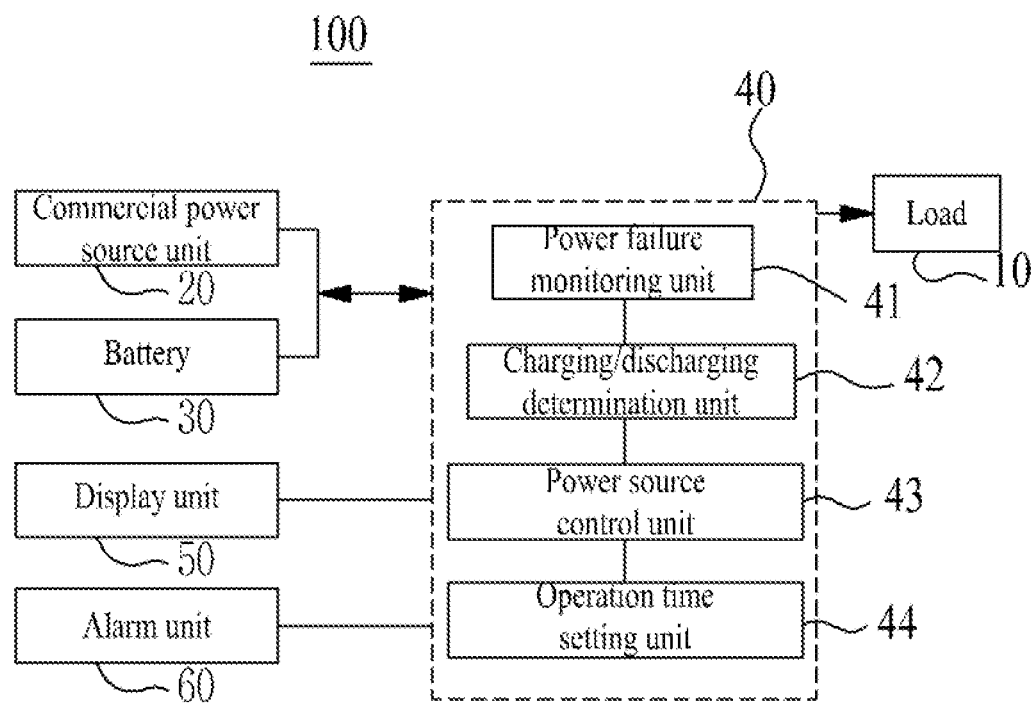
FIG. 2 is a block diagram showing the construction of a main control board shown in FIG. 1.

FIG. 2 is a block diagram showing the construction of the main control board shown in FIG. 1, and FIG. 3 is a diagram illustrating various types of operation modes of the UPS equipped with the battery in accordance with an embodiment of the present invention.

As shown in FIG. 2, the energy storage system in accordance with an embodiment of the present invention is an energy storage system 100 included in each of the first UPS and the second UPS. The energy storage system 100 includes a commercial power source unit 20 configured to supply a load 10 with a first power source, the battery 30 configured to supply the load 10 with a second power source, and a main control board 40 configured to control a power source supplied to the load 10 depending on the state of the commercial power source unit 20 and the battery 30.

The energy storage system 100 in accordance with an embodiment of the present invention further includes a display unit 50 configured to display the state of the battery 30, for example, the battery abnormality alarm when a discharging characteristic provided by the battery manufacturer deviates and an alarm unit 60 configured to notify a user of the state of the energy storage system 100 by outputting voice, such as a warning sound, for example, a 'battery power failure mode operation' or a 'power failure state' or outputting an emergence lamp, for example, the flickering of a red light depending on a state displayed on the display unit 50.

The main control board 40 includes a power failure monitoring unit 41 configured to monitor a power failure state in the commercial power source unit 20, a charging/discharging determination unit 42 configured to determine the charging state of the battery 30, and a power source control unit 43 configured to control the commercial power source unit 20 and the battery 30 so that the first power source or the second power source is supplied to the load 10 depending on the output of the power failure monitoring unit 41 or the charging/discharging determination unit 42.

The main control board 40 further includes an operation time setting unit 44 configured to set an energy storage operation time in the load 10. The power source control unit 43 performs control so that the first power source and the second power source are supplied to the load in accordance with an operation time set in the operation time setting unit 44.

The main control board 40 includes a microprocessor configured to have the calculation ability and a memory device configured to store the condition states. The power failure monitoring unit 41, the charging/discharging determination unit 42, the power source control unit 43, and the operation time setting unit may be implemented in such a manner that the microprocessor operates and controls a program stored in the memory device.

Furthermore, the power source control unit 43 performs control so that the first power source is supplied to the battery 30 depending on the charging state of the battery in the charging/discharging determination unit 42 and performs control so that the second power source is supplied to the load 10 depending on the charging state of the battery in the power failure monitoring unit 41.

Figure 3A:
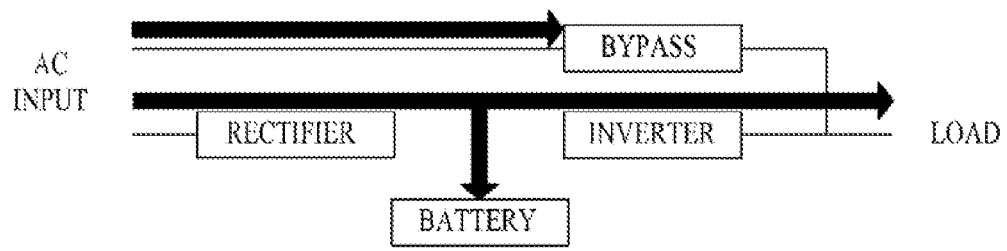
FIGS. 3A, 3B, 3C and 3D are diagrams illustrating various types of operation modes of the UPS equipped with the battery in accordance with an embodiment of the present invention.

That is, as shown in FIG. 3A (a thick line indicates a power flow), in the case of normal operation mode, that is, a common operating state, the power source control unit 43 of the main control board 40 performs control so that power is supplied to the load 10 through the commercial power source unit 20 and the battery 30 is charged. That is, normal operation mode is the state in which power is operated as in a power flow (indicated by the thick line) in a consumer that uses the UPS system. In such a state, the power source control unit 43 performs control so that a first power source (i.e., a commercial power source) is supplied to the load 10 and the battery 30 is charged.

Figure 3B:
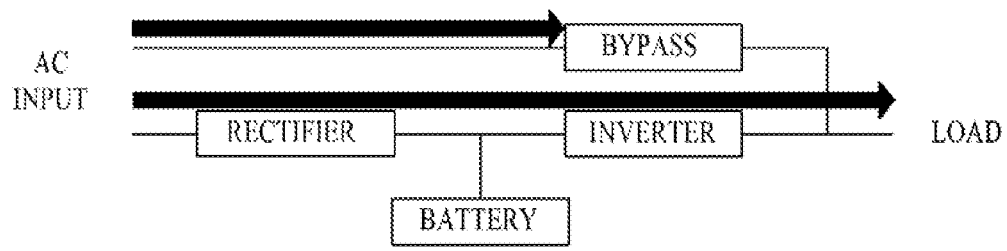

When the charging of the battery 30 is completed, that is, if it is determined that the battery 30 does not need to be charged based on a determination of the charging state in the charging/discharging determination unit 42, as shown in FIG. 3B (a thick line indicates a power flow), the power source control unit 43 stops the charging operation of the bidirectional DC-DC converter and performs control so that the first power source is supplied to the load 10. That is, the power source control unit 43 performs commercial power source-single operation mode.

Figure 3C:
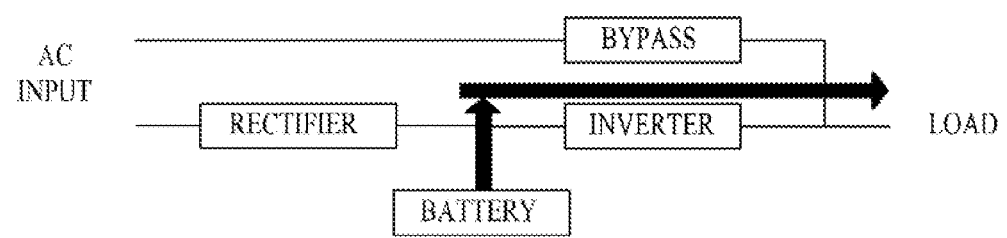

In contrast, if the power failure monitoring unit determines that input to the UPS is power failure operation mode, as shown in FIG. 3C (a thick line indicates a power flow), the power source control unit 43 performs control so that only the second power source is supplied to the load 10, and the alarm unit 60 indicates a 'battery power failure mode operation' that gives a warning. For example, the alarm unit 60 may give a plurality of warnings according to a user setting.

Figure 3D:
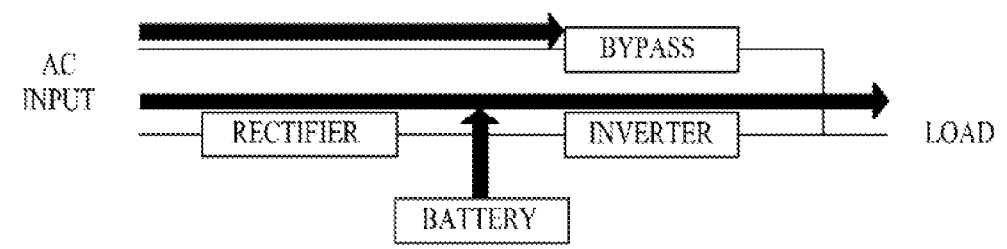

In accordance with the present invention, in sharing operation mode in which the load 10 is shared by the first power source of the commercial power source unit 20 and the second power source of the battery 30, as shown in FIG. 3D (a thick line indicates a power flow), the power source control unit 43 performs control so that the load 10 is shared and supplied with the first power source and the second power source during a peak time set by the operation time setting unit 44.

Control of the rectifier, the converter, etc. shown in FIG. 1 is described below with reference to FIGS. 4 to 6.

Figure 4:
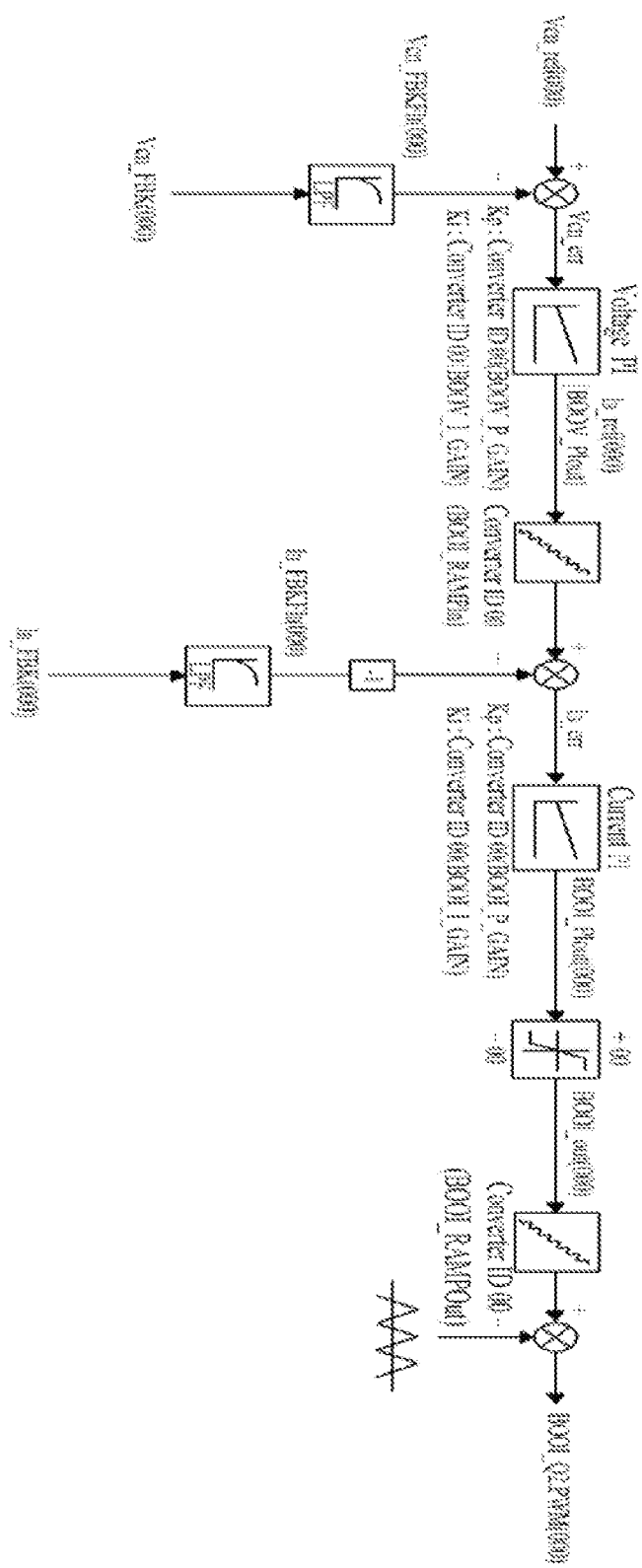
FIG. 4 is a block diagram of a bidirectional converter controller for the UPS for handling an excessive response.
Figure 5A:
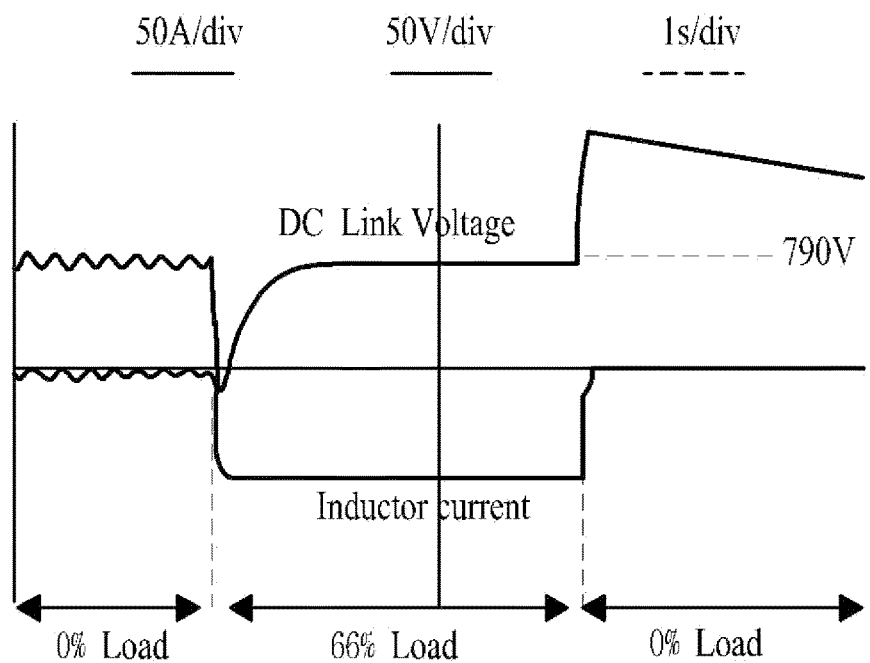
FIGS. 5A and 5B are graphs showing the test results of an excessive response.
Figure 5B:
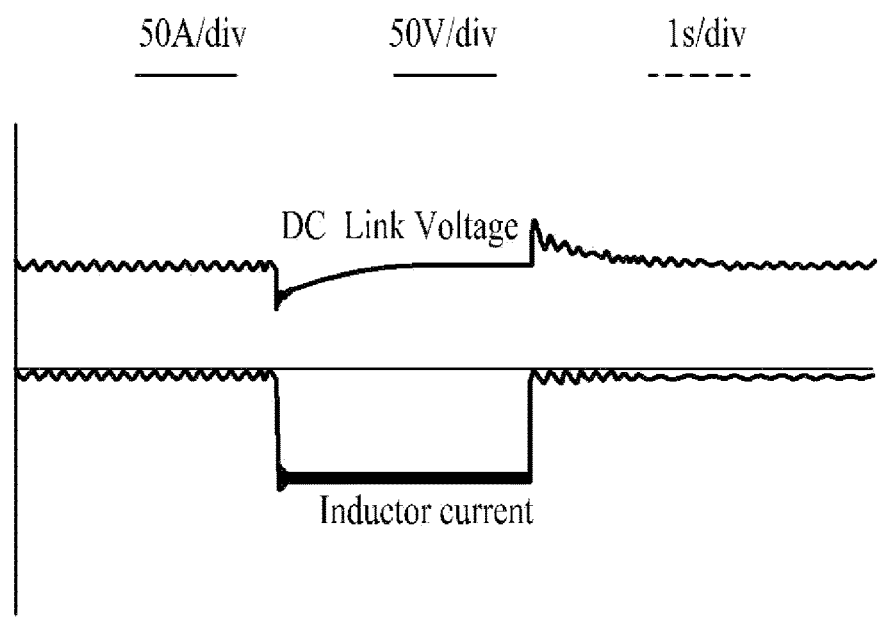
Figure 6:
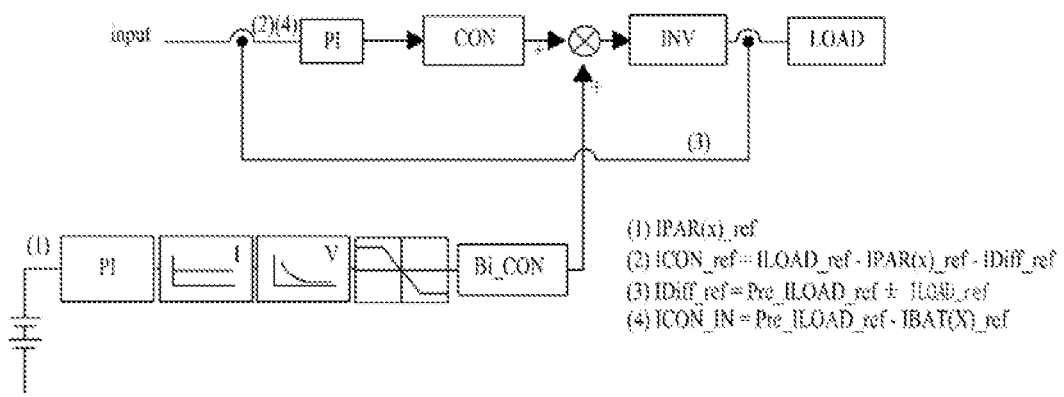
FIG. 6 is a block diagram of the controller for sharing a commercial power source battery load.

FIG. 4 is a block diagram of the controller of the bidirectional converter for the UPS for handling an excessive response, FIG. 5 is a graph showing the test results of the excessive response, and FIG. 6 is a block diagram of a controller for sharing a commercial power source battery load.

In order to increase an excessive response according to a change of the load, the UPS requires DC link voltage converted by the bidirectional converter and a current controller. In the present invention, a bidirectional converter controller, such as that shown in FIG. 4, is provided.

The bidirectional converter controller of FIG. 4 is described below with reference to FIG. 5. Referring to FIG. 5A, the results of tests according to a change of the load when the bidirectional converter performs a discharging operation show that DC link voltage is shifted when the load is turned on or off. In such a case, the UPS generates a DC overvoltage alarm in actual situations. FIG. 5B shows that a change of the DC link voltage is reduced through control of a gain value by the bidirectional converter controller. As in the tests, a change of the load can be handled using voltage using the voltage and the current controller of the bidirectional converter. Furthermore, there is a need for the current controller capable of controlling power supplied to the battery 30 for an energy storage operation. When a load is changed, DC link voltage may be increased by the controller. Thus, if the controller controls a rise of DC link voltage by controlling a gain value, an energy storage operation can be performed so that a commercial power source battery load is shared.

That is, in the UPS applied to the present invention, test conditions of an excessive response are present. In the test conditions, when the UPS normally operates, the battery is connected and the time taken for output voltage to be recovered is measured by changing a load. For tests for an excessive response, reference may be made to KS C IEC 62040-3 5.3 term. Korean industrial Standards (KS) describe the test method, but the resulting values are widely set to 10%. Such an excessive response is determined by the specification of a manufacturer. The test standard of the UPS in accordance with an embodiment of the present invention is within ±5% when a load suddenly changes by 50% and a response thereof is within 50 msec. In this case, the bidirectional converter may be influenced by a change of the load as shown in FIG. 5, which may result in a DC link overvoltage alarm attributable to a rise of DC link voltage. In order to prevent such a problem, a stabilized power source may be supplied to the load even when an energy storage operation is performed.

The controller for sharing the battery load is described below with reference to FIG. 6.

In FIG. 6, a value calculated by the main control board 40 based on a capacity related to a load amount, a discharging peak time zone, and the battery and battery discharging efficiency according to a discharging capacity, a final voltage, a discharging voltage, and a discharging time determines the battery discharging current value.

The battery discharging current value is $I_{BAT(x)\_ref}$. The value is controlled based on the reference value of the battery discharging current. A required rectifier reference current value according to an initial load amount in an energy storage operation and the battery discharging current is $I_{CON\_IN}$.

In this case, when a load is changed, the main control board 40 calculates a changed value $I_{Diff\_ref}$ and controls the value $I_{CON\_ref}$ of the rectifier using the rectifier current limit function of the UPS.

As described above, the main control board 40 prepares for a change of the load and a power failure through continuous calculation.

Secondarily, the UPS controls the current of the bidirectional converter in discharging (i.e., boost mode) based on the calculated value and controls a rise of DC link voltage corresponding to a change of the load by controlling the DC link voltage in response to a changed voltage of the battery so that the battery discharging operation, that is, an energy storage operation, is performed in a predetermined peak time zone.

A method of driving the UPS in accordance with an embodiment of the present invention is described with reference to FIG. 7.

Figure 7:
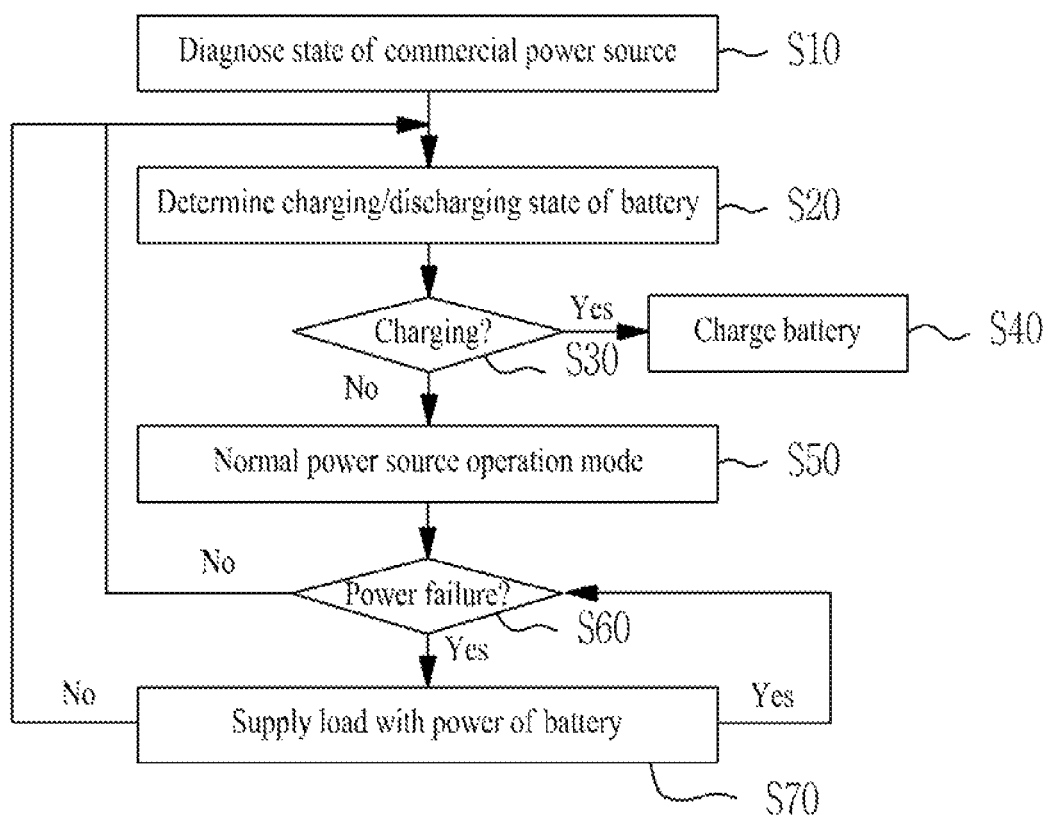
FIG. 7 is a flowchart illustrating the energy storage method of the UPS equipped with the battery in accordance with an embodiment of the present invention.
Figure 8:
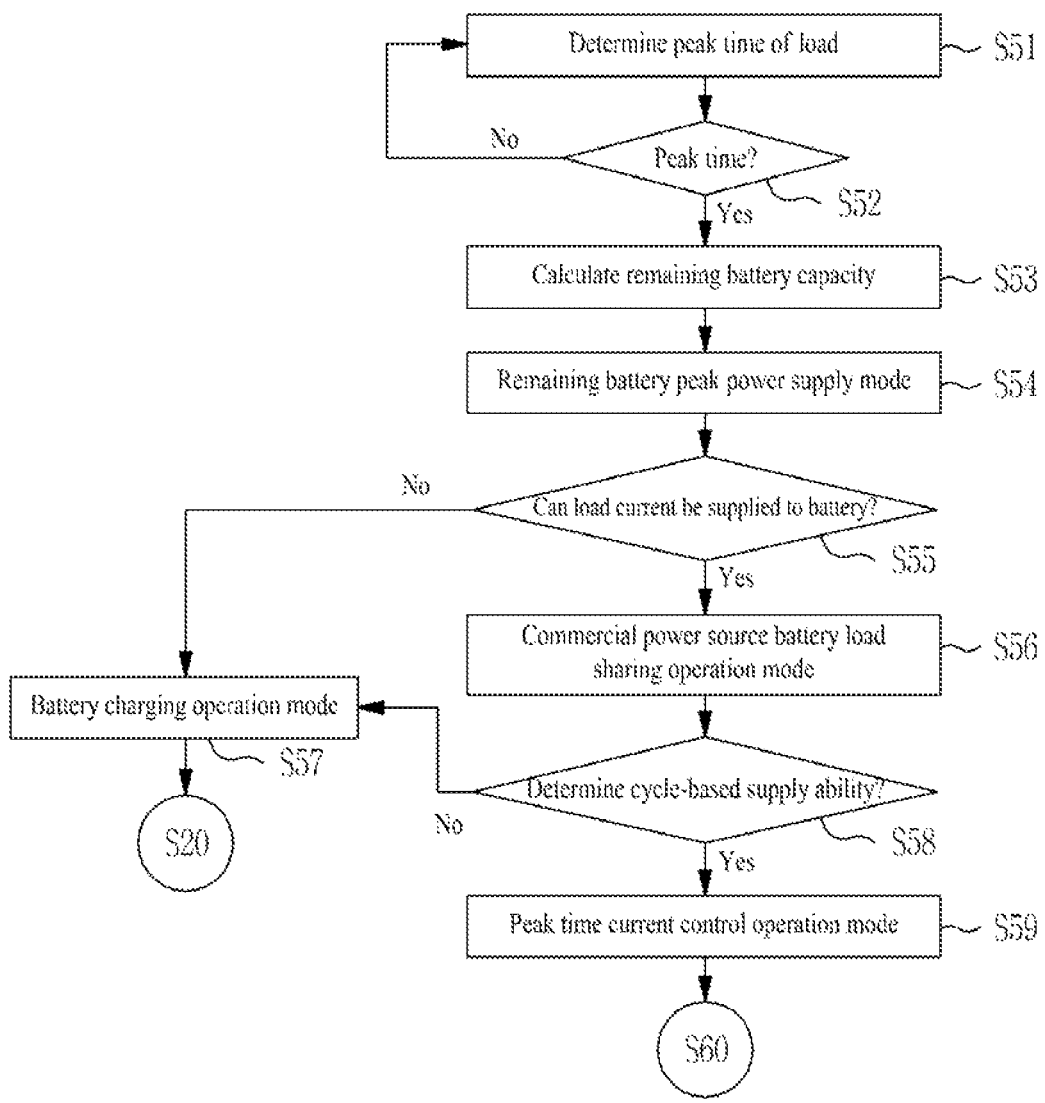
FIG. 8 is a flowchart illustrating common operation mode in accordance with an embodiment of the present invention.

FIG. 7 is a flowchart illustrating the operation method of the UPS equipped with the battery in accordance with an embodiment of the present invention, and FIG. 8 is a flowchart illustrating common operation mode in accordance with an embodiment of the present invention.

First, power is supplied to the load through the first power source of the commercial power source unit 20 in common operation state, and a power flow in a consumer who uses the UPS system in a normal operating state, that is, a state in which the battery 30 is charged, is shown in FIG. 3A. In this state, the first power source is supplied to the load 10 and the battery 30 is charged.

The power failure monitoring unit 41 of the main control board 40 determines whether or not the first power source is normal. Such a determination may be made by diagnosing whether or not a rectifier, an inverter, a bidirectional DC-DC converter, and the battery described in technology that is commonly used and known in the technical field of the present invention, for example, in Korean Patent No. 10-1211114 or 10-1247282 at step S10. The charging/discharging determination unit 42 determines the battery charging state in order to determine whether or not the battery 30 needs to be charged by detecting terminal voltage of the battery 30 using the battery terminal voltage measurement technique disclosed in Korean Patent No. 10-0386053 or 10-0989178, at step S20.

If, as a result of the determination, it is determined that the battery 30 needs to be charged at step S30, the power source control unit 43 of the main control board 40 drives the bidirectional DC-DC converter in charging mode so that the battery 30 is charged and at the same time, power is supplied to the load 10. Accordingly, as shown in FIG. 3A, the battery 30 is charged by supplying the first power source, that is, a commercial power source, to the load 10 and the battery 30 at step S40.

If, as a result of the determination, it is determined that the battery 30 does not need to be charged at step S30, the charging operation of the bidirectional DC-DC converter is stopped and power source operation mode is performed at step S50, as shown in FIG. 3B or 3D. Power source operation mode at step S50 includes single operation mode by the commercial power source unit 20 and common operation mode by the commercial power source unit 20 and the battery 30. Single operation mode and common operation mode are described later with reference to FIG. 8.

Thereafter, the power failure monitoring unit 41 determines whether or not the commercial power source, that is, the first power source, is normally supplied using a voltage sensor that is a known art at step S60. If, as a result of the determination at step S60, it is determined that the commercial power source, that is, the first power source, is not normally supplied, that is, in the case of a power failure state as shown in FIG. 3C, the power source control unit 43 drives the bidirectional DC-DC converter so that power of the battery, that is, the second power source, is supplied to the load 10 through the battery 30 at step S70. In such technology, as known and commonly used in Korean Patent No. 10-0386053 or 10-0989178, for example, the remaining capacity of the battery is determined, the amount of power consumed by the load 10 and the remaining capacity of the battery are checked, and the time for which power can be supplied is displayed. If, as a result of the determination at step S60, it is determined that the commercial power source, that is, the first power source, is normally supplied, step S50 is performed.

When step S70 is executed by the power failure detection unit 41, a signal of, for example 'battery power failure mode operation' is output through the alarm unit 60.

'Commercial power source battery load sharing operation mode' at step S50 in which both the commercial power source unit 20 and the battery 30 supply power sources to the load 10 is described in detail below with reference to FIG. 8.

If the power failure monitoring unit 41 and the charging/discharging determination unit 42 determine that the battery does not need to be charged, the commercial power source is normal, and there is no abnormality as a result of self-diagnosis at step S50, the power source control unit 43 determines whether or not a time zone is a power peak time zone input or set by the user of the UPS in relation to the load 10 of a consumer through the operation time setting unit 44 at step S51.

If, as a result of the determination, it is determined that the time zone is the set or input power peak time zone of the load 10 at step S52, the charging/discharging determination unit 42 calculates the remaining battery capacity of the battery 30 at step S53.

At step S53, the charging/discharging determination unit 42 calculates a current load current and the remaining battery capacity and receives the range of the 'essential remaining capacity of the battery' that has been input by a user depending on the conditions of load equipment or has been previously set and that needs to be essentially maintained in emergency. If it is determined that the current load current may be supplied using an 'available remaining battery processing capacity' other than the set remaining battery capacity (e.g., 50% which may also be changed by a user and randomly set for convenience of description assuming that the capacity of consumer equipment that needs to be essentially driven when a power failure occurs is 50%) during the peak time (that may be set to about 2 hours and also changed by a consumer or commercial power supply network operator), the 'remnant capacity peak power supply mode' is performed at step S54.

Calculation in remnant capacity peak power supply mode at step S54 is performed as follows. Such an example is only illustrative and the present invention is not limited thereto.

For example, assuming that a UPS capacity is 100 KVA, a load equipment capacity is 50 KW, battery rating voltage is 540 V, the number of batteries corresponds to a 2V 240 cells, battery final voltage is 1.75 V, and inverter power conversion efficiency is 0.96, the battery capacity is determined by the power failure compensation time requirement of a user.

In the present invention, the power source control unit 43 controls power of the battery 30 so that discharging is performed for 2 hours in relation to 30% when the peak time set by the operation time setting unit 44 is 2 hours.

The following calculation shows another example under the aforementioned conditions.

1) Calculation of a Maximum Discharging Current of 100 KVA $$Id = \frac{100 \; KVA \times 0.8 \; \text{(load factor)}}{1.75 \; \text{(final voltage)} \times 240 \; \text{(number of cells)} \times 0.96 \; \text{(inverter efficiency)}} = 198 \; A$$

2) Selection of the Battery Capacity

If the power failure compensation time is 30 minutes, an electric current required for the power failure compensation time of 30 minutes is 198 A because 200 AH is equal to a maximum of 173 A and 250 AH is equal to a maximum of 216 A based on lead battery data. Since the 200 AH does not satisfy the specification, 2 V/250 AH/240 cells are selected according to the battery specification of the battery manufacturer or a request from a user.

3) 30% of Battery Capacity in Energy Storage Operation

250 AH×0.3=75 AH

75 AH, that is, 30% of 250 AH, is used in the energy storage operation, and the remaining 70% of 250 AH is used as emergency power prepared for a power failure.

4) Discharging Time of 2 Hours (i.e., Peak Power Time)

75 AH/2H=37.5 A wherein 37.5 A×0.74 (battery discharging efficiency is 74% during discharging for 2 hours)=27.7 A/H The battery current for the energy storage operation requires 27.7 A per hours. If the discharging time is increased, the battery has higher discharging efficiency (e.g., 84% during discharging for 3 hours). In such a case, 75 AH/3 H=25 A is required. That is, 21 A is required per hour as in 25 A×0.84=21 A/H.

Accordingly, a total of DC power during operation for 2 hours=27.7 A×1.75 V (final voltage)×240 (number of cells)= 11.6 KW/H×2 H=23.2 KW.

A total of DC power during operation for 3 hours=21 A×1.75 V (final voltage)×240 (number of cells)=8.8 KW/H×3 H=26.4 KW.

If the energy storage operation time is increased as in the above calculation, a lot of discharging power can be secured due to improved discharging efficiency. Accordingly, energy can be reduced that much.

5) when a Load Amount is 50 KW, Required DC Power is 124 A as in the Following Calculation.

$$Id = \frac{50000}{1.75 \times 240 \times 0.96} = 124\ A$$

6) Required Load DC Power

Load current=battery current+rectifier current

Rectifier current=load current−battery current

124 A−27.7 A=96.3 A: required rectifier current in a 2-hour energy storage operation Rectifier current=load current−battery current 124 A−21 A=103 A: required rectifier current in a 3-hour energy storage operation That is, the battery of 27.7 A operates in the energy storage operation, the rectifier supplies 96.3 A using the rectifier current limit function, that is, the basic function of the UPS, and a discharging operation is performed for the peak time set to 2 hours based on 124 A required for the load.

In order to improve discharging efficiency of the battery and also perform the energy storage operation as described above, the controller requires the battery current of the DC-DC converter.

70% of 250 AH, that is, 175 AH, in the calculation example of the essential remaining battery capacity 30% of 250 AH, that is, 75 AH, in the calculation example of the available remaining battery capacity The charging/discharging determination unit 42 calculates the current load current and the remaining battery capacity at step S53 and determines whether or not the current load current may be supplied using the 'available remaining battery capacity' other than the 'essential remaining capacity' during the current peak time at step S55.

If, as a result of the determination at step S55, it is determined that the current load current may not be supplied to the load 10 using the available remaining battery capacity during the current peak time, the charging/discharging determination unit 42 calculates a current capacity that may continue to be discharged during the peak time using only the 'available remaining battery capacity'.

As shown in FIG. 3D, 'commercial power source battery load sharing operation mode' in which discharging is performed using commercial power discharged by only the current capacity calculated during the peak time and the current capacity that may be continue to be supplied by the battery during the peak time is performed at step S56.

If, as a result of the determination at step S55, it is determined that the current load current may not be supplied to the load 10 using the available remaining battery capacity during the current peak time, battery charging mode is executed at step S57.

In this case, if the load current may not be supplied, the battery load sharing ratio set by a user may be less than 1% of a total load current, but this may be randomly set by a user.

Step S57 proceeds to step S20 in which the charging state of the battery is determined.

At step S56, the power source control unit 43 calculates an electric current that flows through the load 10 and the remaining battery capacity in a specific cycle that is a specific cycle set by a user, for example, a cycle calculated by the main control board 40 by taking a process of calculating the capacity of the battery and the characteristics of consumer equipment, determines whether or not the calculated electric current and the remaining battery capacity may continue to be supplied during the peak time, and performs 'cycle-based supply ability determination step' based on a result of the determination at step S58.

If, as a result of the determination at step S58, it is determined that the calculated electric current and the remaining battery capacity may not be supplied during the peak time, the process proceeds to step S57.

That is, in order to perform calculation as at step S58 according to a change of the load and supply power to the load based on the peak power time, the rectifier and the DC-DC converter are controlled. In order to prevent the continued overdischarging of the battery attributable to a reduced battery capacity due to the use of the battery for a long time or the battery temperature, voltage of the battery corresponding to an available remaining battery capacity is set, the energy storage operation is stopped based on any one of the set voltage and a peak time setting value that is first reached, power is supplied to the load by controlling the rectifier, and the DC-DC converter switches from discharging mode to charging mode.

During commercial power source battery sharing operation mode at step S56, the charging/discharging determination unit 42 and the power source control unit 43 periodically calculates the remaining battery capacity and a load current, calculates an electric current that may continue to be supplied during the peak time based on the calculated remaining battery capacity and load current, and perform 'time current control operation mode' in which the present current is changed into an electric current that may be supplied and an existing operation continues to be performed during the peak time at step S59.

After step S59 is terminated or each mode is terminated at each step, the charging/discharging determination unit 42 determines the charging state of the battery 30 at step S20 via step S60.

Furthermore, the operation of a single UPS has been described with reference to FIGS. 7 and 8, for convenience of description, but the present invention may be applied to two UPSs that operate in parallel as shown in FIG. 1.

As described above, in accordance with the energy storage system of the UPS equipped with the battery and the method of driving the same according to the embodiments of the present invention, there are advantages in that the utilization of the battery can be increased and emergency power prepared for a power failure can be secured through the energy storage operation, some of an installation cost for the use of the battery can be recovered by a reduction of energy, and a power reservation ratio for the use of power can be increased by reducing power during daytime.

Furthermore, in accordance with the energy storage system of the UPS equipped with the battery and the method of driving the same according to the embodiments of the present invention, there are advantages in that power can be further reduced because the battery capacity is increased in order to increase a power failure compensation time and the lifespan of the battery can be extended by reducing the number of times of discharging related to the lifespan of the battery.

Furthermore, in accordance with the energy storage system of the UPS equipped with the battery and the method of driving the same according to the embodiments of the present invention, there are advantages in that more time for charging the battery after the battery is discharged during daytime can be increased as compared with a single UPS because the first UPS and the second UPS are used, discharging efficiency of the battery can be improved, and the lifespan of the battery can be extended.

Furthermore, in accordance with the energy storage system of the UPS equipped with the battery and the method of driving the same according to the embodiments of the present invention, there is an advantage in that a power reservation ratio for the use of power can be increased by reducing power during daytime.

Although some exemplary embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An energy storage system included in an Uninterruptible Power Supply (UPS) for supplying a power source to a load that needs the uninterruptible power, comprising:
   a commercial power source unit configured to supply a first power source to the load;
   a battery configured to supply a second power source to the load;
   a power failure monitoring unit configured to monitor a power failure state in the commercial power source unit;
   a charging/discharging determination unit configured to determine a charging state of the battery and to estimate remaining capacity of the battery;
   a power source control unit configured to control the commercial power source unit and the battery in response to output of the power failure monitoring unit or the charging/discharging determination unit so that the first power source or the second power source is supplied to the load; and
   an operation time setting unit configured to set a peak time zone of the load;
   wherein the power source control unit, when the first power source is normal and it is the peak time zone, divides and supplies the first power source and the second power source to the load, while the second power source is supplied within an available remaining battery capacity except for an essential remaining capacity of a battery that needs to be essentially maintained in emergency;
   wherein the power source control unit, when the first power source is normal and when it is not the peak time zone, controls the first power source to be supplied to the load;
   wherein the power source control unit, when the first power source is cut off, controls the second power source to be supplied to the load;
   wherein the power source control unit determines whether it is possible to supply only the available remaining battery capacity to the load during the peak time zone;
   wherein when it is impossible to supply only the available remaining battery capacity to the load, the power source control unit calculates a current capacity that may continue to be discharged at a substantially constant rate during the peak time using only the available remaining battery capacity and supplies the calculated current capacity to the second power source during the peak time zone such that the second power source is shared with the first power source to be supplied to the load.

2. The energy storage system of claim 1, wherein the power source control unit shares and supplies the first power source and the second power source, while calculating the remaining capacity of the battery and a load current periodically and changing the second power source into a suppliable current.

3. The energy storage system of claim 1, wherein:
   the UPS comprises a first UPS and a second UPS,
   the first UPS and the second UPS operate alternately, and
   the battery of the second UPS is charged when the battery of the first UPS is discharged.

4. The energy storage system of claim 1, wherein:
   the UPS comprises a first UPS and a second UPS, and
   the first UPS and the second UPS are driven simultaneously and charged simultaneously.

5. The energy storage system of claim 1, further comprising:
   a display unit configured to display a state of the battery, and
   an alarm unit configured to output a warning sound or an emergency lamp in response to a state displayed on the display unit.

6. A method of operating an Uninterruptible Power Supply (UPS) comprising an energy storage system for supplying a power source to a load that needs the uninterruptible power, the method comprising steps of:
   (a) monitoring, by a power failure monitoring unit, a power failure state of a commercial power source unit for supplying a first power source to the load and determining, by a charging/discharging determination unit, a charging state of a battery for supplying a second power source to the load;
   (b) setting, by an operation time setting unit, a peak time zone of the load;
   (c) dividing, by a power source control unit, the first power source and the second power source in the peak time zone set at the step (b) and supplying the first power source and the second power source to the load when the first power source is normal; and
   (d) controlling, by the power source control unit, the first power source to be supplied to the load when the power source is normal and it is not the peak time zone and the second power source to be supplied to the load when the first power source is at the power failure state;
   wherein, in the step (c), the charging/discharging determination unit calculates a remaining capacity of a battery and the power source control unit supplies the second power source within an available remaining battery capacity except for an essential remaining capacity of the battery that needs to be essentially maintained in emergency;
   wherein, in the step (c), the power source control unit determines whether only the available remaining battery capacity may be supplied to the load during the peak time zone, and when it is impossible to supply only the available remaining battery capacity to the load, the power source control unit calculates a current capacity that may continue to be discharged at a substantially constant rate during the peak time using only the available remaining battery capacity and supplies the calculated current capacity to the second power source during the peak time zone such that the second power source is shared with the first power source to be supplied to the load.

7. The method of claim 6, wherein in the step (c), the power source control unit calculates the remaining capacity of the battery and a load current periodically during the supplying of the first power source and the second power source and changes the second power source into a suppliable current.

8. The method of claim 6, wherein the step (a) comprises displaying or notifying the state of the commercial power source unit and the operating state of the battery determined by the power failure monitoring unit and the charging/discharging determination unit.

9. The method of claim 6, wherein the steps (a) to (c) are repeatedly executed by a first UPS and a second UPS.

10. The method of claim 6, wherein the steps (a) to (c) are simultaneously performed by a first UPS and a second UPS.

* * * * *